2,946,786

3-OXO-11α-HYDROXY-11,19-EPOXYCARD-20(22)-ENOLIDES AND DERIVATIVES THEREOF

John S. Baran, Chicago, Ill., assignor to G. D. Searle & Co., Chicago, Ill., a corporation of Delaware No Drawing. Filed July 16, 1959, Ser. No. 827,457

19 Claims. (Cl. 260—239.57)

The present invention relates to a novel group of ouabagenin derivatives and, more particularly to 3-oxo-11α-hydroxy-11,19-epoxy-5α,14α-card-20(22)-enolides and derivatives thereof. The compounds with which this invention is principally concerned can be represented as those of the general structural formula

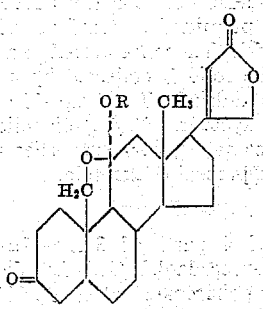

wherein R is a member of the class consisting of hydrogen and lower alkyl radicals, their $\Delta^{14}$, $\Delta^{4,14}$, 14β-hydroxy, $\Delta^4$-14β-hydroxy- and 5β,14β-dihydroxy derivatives, as well as the 3-hydroxy analogs obtained by their reduction with sodium borohydride. The compounds of this invention offer valuable pharmacological activities, especially as antagonists against the sodium-retaining activity of desoxycorticosterone and as anti-inflammatory agents. Thus they have an inhibitory effect on the heat, swelling, redness, and granuloma formation characteristic of the inflammatory response to tissue injury. The compounds of this invention can be conveniently prepared by oxidizing ouabagenin 1,19-acetonide with chromic anhydride in pyridine followed by heating with alumina and ethanol. The resulting 3,11-dioxo-5β,14β,19-trihydroxycarda-1,20(22)-dienolide is hydrogenated in the present of palladium-on-charcoal, typically in methanol, to yield 3-oxo-5β,11α,14-trihydroxy-11,19-epoxycard-20(22)-enolide. As is characteristic for the compounds of the foregoing structural formula in which R represents hydrogen, this product exists in an equilibrium mixture with the 3,11-dioxo-5β,14,19-trihydroxy-card-20(22)-enolide of the structural formula

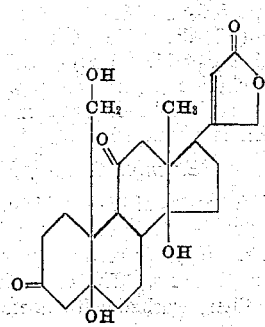

The 5-hydroxy derivative is readily converted to the $\Delta^4$-derivative by heating alone or with an alkanoic acid such as acetic acid. If this reaction is carried out in an alkanol ROH and in the presence of an acid catalyst, such as an alkanesulfonic acid or an arylsulfonic acid, there is formed a 3-oxo-11α-alkoxy-11,19-epoxy-14β-hydroxycarda-4,20(22)-dienolide of the structural formula

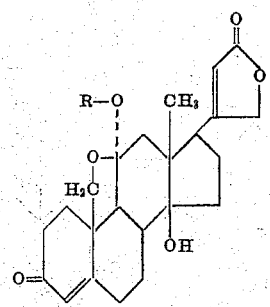

These carda-4,20(22)-dienolides are conveniently converted to the card-20(22)-enolides by hydrogenation, typically using palladium-on-charcoal as a catalyst. The 11α-alkoxy group can be changed to a hydroxy group by treatment with aqueous acid. The foregoing 14-hydroxy compounds with or without a $\Delta^4$ unsaturation are conveniently dehydrated to the $\Delta^{14}$ analogs by treatment with pyridine and a thionyl halide. Again a 11α-alkoxy group can be dealkylated by hydrolysis with aqueous acid. The $\Delta^{14}$-unsaturation can be removed by hydrogenation, typically in the presence of palladium-on-charcoal.

The 3-oxocard-20(22)-enolides of this invention are conveniently converted to the corresponding 3β-hydroxy derivatives by reduction with sodium borohydride.

The compounds which constitute this invention and their preparation will appear more fully from a consideration of the following examples which are given for purposes of illustration only and are not to be construed as limiting the invention in spirit or in scope. In these examples quantities are indicated as parts by weight.

Example 1

A mixture of 30 parts of chromic anhydride and 400 parts of pyridine is prepared by adding the chromic anhydride to the pyridine with stirring over a period of one hour at 15–20° C. To this mixture is added a slurry of 30 parts of ouabagenin-1,19-acetonide and 400 parts of pyridine. After the mixture has been stirred for one day, it is diluted with 1500 parts of chloroform and filtered. The filtrate is extracted with 500 parts of saturated aqueous solution of sodium bicarbonate, dried over sodium sulfate, and taken to dryness under vacuum. The residue is dissolved in 1000 parts of ethanol and the solution is stirred at reflux for 1 hour with 290 parts of basic alumina. The mixture is filtered and the alumina is extracted with hot ethanol; the combined filtrate and extract is concentrated under vacuum to a small volume. The crystalline product is collected on a filter, washed with ethanol and dried at 60° C. The 3,11-dioxo-5β,14β,19-trihydroxycarda-1,20(22)-dienolide thus obtained melts at about 195–200° C.

A mixture of 2 parts of this product, 100 parts of ethanol and 0.2 part of a 5% palladium-on-charcoal catalyst is stirred in an atmosphere of hydrogen until one molecular equivalent of hydrogen is absorbed. Then the mixture is diluted with methanol until the product which precipitates partially during the hydrogenation is dissolved. The mixture is then filtered and the filtrate is concentrated under vacuum at 25° C. to a small volume.

The resulting solid is collected on a filter, washed with methanol and dried. Crystallization from acetone-methanol yields 3-oxo-5β,11α,14β-trihydroxy-11,19-epoxycard-20(22)-enolide which melts at about 178–181° C. Infrared maxima observed at 2.82, 2.90, 3.38, 5.69–5.77, 5.86, 6.13, 8.61, 9.73, 10.30, and 11.07 microns. A methanolic solution shows an ultraviolet maximum at 218 millimicrons with an extinction coefficient of about 17,300. The compound is in equilibrium with 3,11-dioxo-5β,14β,19-trihydroxycard-20(22)-enolide. The compounds thus in equilibrium have the structural formulas

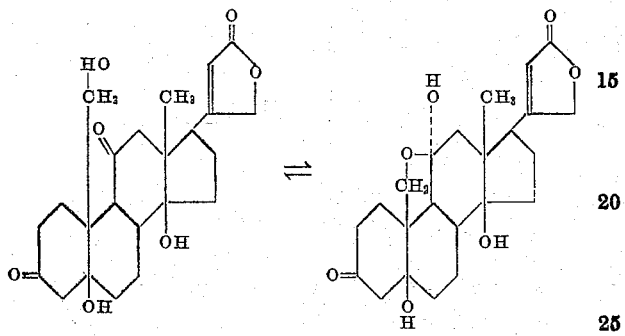

*Example 2*

A mixture of 2 parts of 3-oxo-5β,11α,14β-trihydroxy-11,19-epoxycard-20(22)-enolide and 10 parts of acetic acid is refluxed for 10 minutes and then evaporated to dryness under vacuum. The residue is triturated with acetone and petroleum ether to yield a crystalline product. This is collected by filtration, washed with acetone and dried. Crystallization of the crude product from acetone yields 3-oxo-11α,14β-dihydroxy-11,19-epoxycarda-4,20(22)-dienolide melting at about 248–250° C. Infrared maxima are observed at 2.89, 3.38, 5.71, 5.83, 6.02, 6.16, 8.70, 9.71, 11.30, 11.56, and 12.30 microns. A methanolic solution shows ultraviolet maxima at 218 and 244 millimicrons with extinction coefficients of about 20,000 and 14,300, respectively. The compound, in its epoxide form, has the structural formula

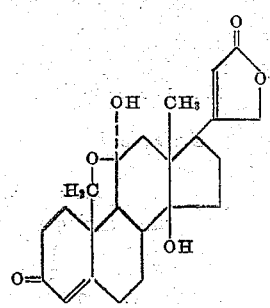

*Example 3*

A solution of 6 parts of 3-oxo-11α,14β-dihydroxy-11,19-epoxycarda-4,20(22)-dienolide, 60 parts of methanol and 0.5 part of p-toluenesulfonic acid is stirred for several hours and then concentrated to a small volume. The solid which precipitates is collected by filtration, washed with methanol, and dried. Crystallization from ethanol yields 3-oxo-11α-methoxy-11,19-epoxy-14β-hydroxycarda-4,20(22)-dienolide which melts at about 258–261° C. Infrared maxima are observed at 2.82, 3.40, 5.77, 6.02, 6.18, 7.69, 8.37, 9.09, 10.36, and 11.64 microns. A methanolic solution shows ultraviolet maxima at 219 and 240 millimicrons with extinction coefficients of about 22,000 and 17,500, respectively. The specific rotation of a 1% chloroform solution α_D is +149.8°.

Substitution of 70 parts of ethanol for the methanol used in the preceding process yields 3-oxo-11α-ethoxy-11,19-epoxy-14β-hydroxycarda-4,20(22)-dienolide. Ultraviolet maxima are shown by a methanolic solution at about 219 and 240 millimicrons with molecular extinction coefficients of about 21,800 and 17,300, respectively. The compound has the structural formula

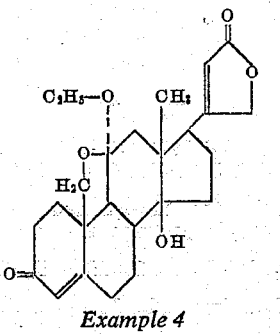

*Example 4*

A mixture of 2 parts of 3,11-dioxo-5β,14β,19-trihydroxycarda-1,20(22)-dienolide, 100 parts of methanol, and 0.2 part of a 5% palladium-on-charcoal catalyst is stirred in an atmosphere of hydrogen until one molecular equivalent of hydrogen has been absorbed. The mixture is then diluted with methanol until the product which precipitates partially during the hydrogenation is dissolved. The filtrate is concentrated to a small volume and then 0.2 part of p-toluenesulfonic acid is added. The solution which results is permitted to stand at room temperature for 12 hours and is then concentrated to a smaller volume and cooled. The solid is collected by filtration, washed with methanol and dried. The 3-oxo-11α-methoxy-11,19-epoxy-14β-hydroxycarda-4,20(22)-dienolide thus obtained has the same physical properties as the methoxy derivative of the preceding example.

*Example 5*

A mixture of 4 parts of 3-oxo-11α-methoxy-11,19-epoxy-14β-hydroxycarda-4,20(22)-dienolide, 0.4 part of 5% palladium-on-charcoal catalyst and 100 parts of methanol is stirred in an atmosphere of hydrogen until one equivalent of hydrogen is absorbed. The mixture is then filtered and the filtrate is evaporated to dryness. The crude residue is recrystallized from methanol to yield 3-oxo-11α-methoxy-11,19-epoxy-14β-hydroxycard-20(22)-enolide melting at about 228–230° C. Infrared maxima are observed at 2.83, 3.41, 5.77–5.83, 6.17, 8.55, 9.20, 10.22, 11.01, and 11.57 microns. A methanolic solution shows an ultraviolet maximum at 217 millimicrons with an extinction coefficient of about 16,640. The specific rotation of a chloroform solution is +83.6°. The compound has the structural formula

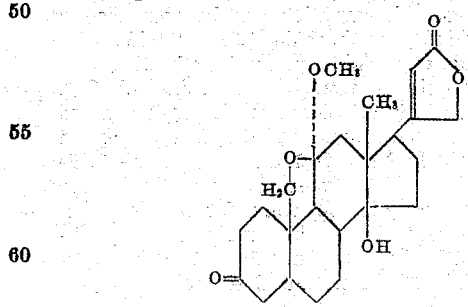

By substitution of 3-oxo-11α-ethoxy-11,19-epoxy-14β-hydroxycarda-4,20(22)-dienolide as a starting material there is obtained 3-oxo-11α-ethoxy-11,19-epoxy-14β-hydroxycard-20(22)-enolide. The molecular extinction coefficient of a methanolic solution has a maximum at 217 millimicrons which is about 16,700.

*Example 6*

A mixture of 2 parts of 3-oxo-11α-methoxy-11,19-epoxy-14β-hydroxycard-20(22)-enolide, 0.2 part of p-toluenesulfonic acid, 50 parts of acetone and 5 parts of water is stirred for 2 hours. The crystalline precipitate is collected on a filter, washed with acetone and dried.

There is thus obtained 3-oxo-11α,14β-dihydroxy-11,19-epoxycard-20(22)-enolide which melts at about 225–228° C. Infrared maxima are observed at 2.89, 2.93, 3.39, 5.75, 5.88, 6.14, 8.60, 9.25, 9.72, 10.20, 11.10 and 11.53 microns A methanolic solution shows a maximum at 217 millimicrons with an extinction coefficient of about 17,700 The specific rotation of a pyridine solution is +66.5°. The compound, in its epoxy form, has the structural formula

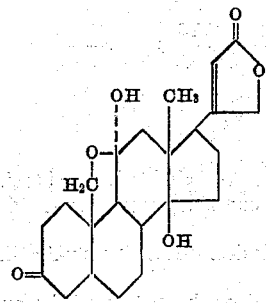

The same compound can likewise be obtained by subjecting 3-oxo-11α,14β-dihydroxycarda-4,20(22)-dienolide to the procedure of Example 5.

*Example 7*

To a solution of 1 part of 3-oxo-11α-methoxy-11,19-epoxy-14β-hydroxycard-20(22)-enolide in 5 parts of pyridine is added at 0° C. a solution of 3 parts of thionyl chloride and 15 parts of pyridine. After 5 minutes the mixture is diluted with chloroform, washed with aqueous sodium bicarbonate, dried over sodium sulfate, and evaporated to dryness under vacuum. Trituration of the residue in methanol yields 3-oxy-11α-methoxy-11,19-epoxycarda-14,20(22)-dienolide. Infrared maxima are observed at 3.39, 5.72, 5.84, and 6.13 microns.

Substitution of the 11α-ethoxy homolog as a starting material yields 3-oxo-11α-ethoxy-11,19-epoxycarda-14,20(22)-dienolide, a compound which shows infrared maxima at about 3.4, 5.72, 5.85, and 6.14 microns. It has the structural formula

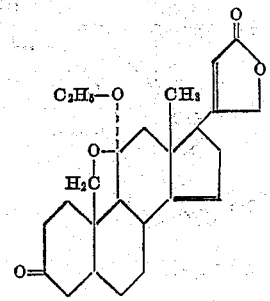

Hydrolysis of the foregoing 11α-methoxy derivative by the procedure of Example 6 yields 3-oxo-11α-hydroxy-11,19-epoxycarda-14,20(22)-dienolide which shows infrared maxima at about 2.91, 3.39, 5.73, 5.85, and 6.14 microns.

*Example 8*

To a mixture of 20 parts of 3-oxo-11α-methoxy-11,19-epoxy-14β-hydroxycarda-4,20(22)-dienolide and 100 parts of pyridine is added a solution of 6.4 parts of thionyl chloride in 25 parts of pyridine at 0° C. After 10 minutes the solution is diluted with 350 parts of chloroform. The organic solution is washed with saturated aqueous sodium bicarbonate, dried over sodium sulfate and evaporated to dryness under vacuum. Crystallization of the crude product from dichloromethane yields 3-oxo-11α - methoxy - 11,19 - epoxycarda - 4,14,20(22) - trienolide melting at about 212–214° C. Infrared maxima are observed at 3.44, 5.72, 6.05, 6.14, 6.22, 9.30, 9.51, 10.05, 11.62, and 12.50 microns. A methanolic solution shows ultra-violet maxima at 217 and 241 millimicrons with molecular extinction coefficients of about 20,200 and 18,500, respectively. The specific rotation of a 1% chloroform solution is +119.5°. The compound has the structural formula

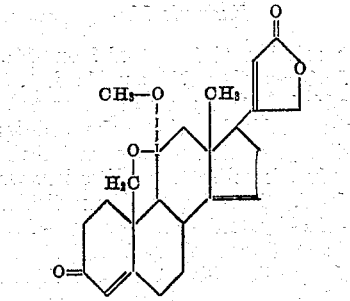

Substituting as a starting material 3-oxo-11α-ethoxy-11,19-epoxy-14β-hydroxycarda-4,20(22)-dienolide there is obtained 3 - oxo - 11α - ethoxy-11,19-epoxycarda-4,14,20(22)-trienolide. The ultraviolet absorption spectrum shows maxima at 217 and 241 millimicrons with molecular extinction coefficients of about 20,000 and 18,500, respectively.

*Example 9*

A mixture of 4 parts of 3-oxo-11α-methoxy-11,19-epoxycarda-4,14,20(22)-trienolide, 40 parts of ethyl acetate, 40 parts of methanol and 1 part of 5% palladium-on-carcoal is stirred in an atmosphere of hydrogen until two equivalents have been absorbed. The mixture is filtered and the filtrate is concentrated to a small volume. The residue which precipitates is collected by filtration, washed with methanol and dried. Crystallization of the crude product from dichloromethane in methanol yields 3-oxo-11α-methoxy-11,19-epoxy-5α,14α-card-20(22)-enolide which melts at about 192–194° when heated rapidly. When heated slowly it appears to soften at about 190° C. and then melts at about 230–250° C. Infrared maxima are observed at 3.40, 5.70, 5.83, 6.15, 8.70, 9.88, 11.20 and 11.50 microns. A methanolic solution shows an ultraviolet maximum at 217 millimicrons with an extinction coefficient of about 15,000. The specific rotation of a 1% chloroform solution is +126.5°. The compound has the structural formula

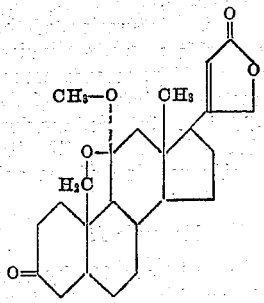

Substitution as a starting material of 3-oxo-11α-ethoxy-11,19 - epoxycarda - 4,14,20(22) - trienolide yields 3-oxo-11α-ethoxy-11,19-epoxy-5α,14α - card - 20(22) - enolide. Infrared maxima are observed at about 3.39, 5.71, 5.83, and 6.14 microns.

*Example 10*

A warm solution of 1 part of 3-oxo-11α-methoxy-11,19-epoxycarda-4,14,20(22)-trienolide and 50 parts of acetone is diluted with 10 parts of water. To the solution is then added 0.05 part of p-toluenesulfonic acid. The solution is concentrated until crystallization starts and it is then cooled. The crude product is collected by filtration, washed with acetone and dried. Crystallization from acetone yields the product which exists primarily in the non-epoxidal form as 3,11 - dioxo - 19 - hydrocarda-4,14,20(22)-trienolide. It melts at about 231–233° C.

Infrared maxima are observed at about 3.02, 3.39, 5.68, 5.84, 6.00, 6.12, 8.58, 9.56, 11.18, and 11.43 microns. A methanolic solution shows ultraviolet maxima at 217 and 237 millicrons with molecular extinction coefficients of about 20,600 and 18,200, respectively.

*Example 11*

To a warm solution of 1 part of 3-oxo-11α-methoxy-11,19-epoxy-5α,14α-card-20(22)-enolide in 50 parts of acetone are added first 10 parts of water and then 0.05 part of p-toluenesulfonic acid. The solution is concentrated until crystallization ensues and then is cooled. The crude product is collected by filtration, washed with acetone and dried. Crystallization from dichloromethane yields 3-oxo-11α - hydroxy - 11,19 - epoxy - 5α,14α - card-20(22)-enolide melting at about 225–227° C. Infrared maxima are observed at about 2.92, 3.40, 5.75, 5.83, 6.15, 9.21, 9.40, 11.09 and 11.53 microns. A methanolic solution shows an ultraviolet maximum at about 215 millimicrons with an extinction of about 17,000. The compound, in its epoxidal structure, has the formula

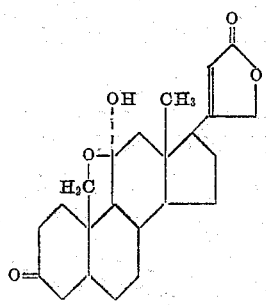

*Example 12*

A mixture of 2 parts of 3-oxo-11α-methoxy-11,19-epoxy-5α,14α-card-20(22)-enolide, 1 part of sodium borohydride and 100 parts of a 4:1 mixture of dioxane and water is stirred for 45 minutes at room temperature and then acidified with 2-N sulfuric acid. The mixture is diluted with water and concentrated under vacuum. The remaining solution is extracted thoroughly with chloroform. This extract is washed with water, aqueous sodium bicarbonate, dried over sodium sulfate, and evaporated to dryness. Trituration of the residue with acetone and ether yields a product which on recrystallization from acetone and petroleum ether yields 3β,11α-dihydroxy-11,19-epoxy-5α,14α-card-20(22)-enolide melting at about 205–207° C. Infrared maxima are observed at 2.92, 3.41, 5.73, 6.14, 8.62, 9.72, 10.05 and 11.09 microns. The specific rotation of the chloroform solution is +54.8°.

*Example 13*

A mixture of 1 part of 3-oxo-11α-hydroxy-11,19-epoxy-5α,14α-card-20(22)-enolide, 1 part of sodium borohydride and 100 parts of a 4:1 mixture of dioxane and water is stirred for 2 hours and then acidified with 2-N sulfuric acid. The mixture is diluted with water and extracted with chloroform. The chloroform extract is washed with saturated aqueous sodium bicarbonate, dried over sodium sulfate and evaporated to dryness. Trituration of the residue with acetone yields a crystalline solid which is recrystallized from acetone to yield 3β,11β,19-trihydroxy-5α,14α-card-20(22)-enolide melting at about 277–278° C. Infrared maxima are observed at 2.83, 2.94, 3.40, 5.72, 6.15, 7.98, 11.20 and 11.78 microns. The specific rotation of a methanol solution is +48.4°. The same product can also be obtained by the sodium borohydride reduction of the foregoing procedure when there is used as a starting material 3β,11α-dihydroxy-11,19-epoxy-5α,14α-card-20(22)-enolide.

What is claimed is:
1. A member of the class consisting of the compounds of the formula

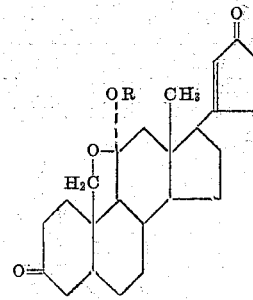

and their Δ$^{14}$, and Δ$^{4,14}$ derivatives, wherein R is a member of the class consisting of hydrogen and lower alkyl radicals.

2. 3-oxo-11α-hydroxy-11,19-epoxy-5α,14α-card-20(22)-enolide.

3. A compound of the structural formula

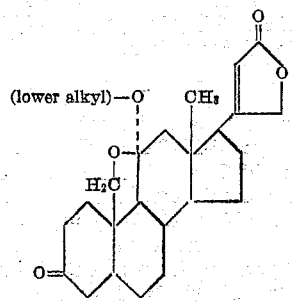

4. 3-oxo-11α-methoxy-11,19 - epoxy - 5α,14α-card-20(22)-enolide.

5. A compound of the structural formula

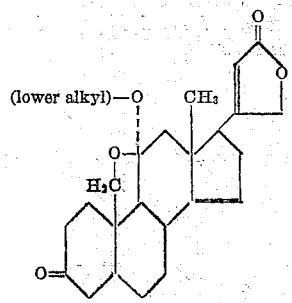

6. 3-oxo-11α-methoxy-11,19 - epoxycarda - 14,20(22)-dienolide.

7. 3-oxo-11α-hydroxy-11,19 - epoxycarda - 14,20(22)-dienolide.

8. A compound of the structural formula

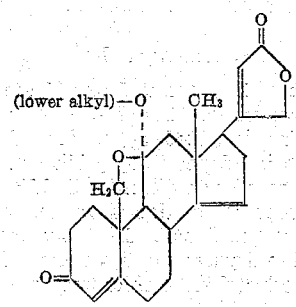

9. 3-oxo-11α-methoxy-11,19 - epoxycarda-4,14,20(22)-trienolide.

10. A compound of the structural formula

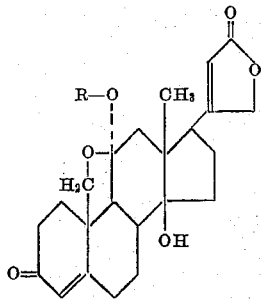

wherein R is a member of the class consisting of hydrogen and lower alkyl radicals.

11. 3-oxo-11α-methoxy-11,19 - epoxy - 14β - hydroxy-carda-4,20(22)-dienolide.

12. 3 - oxo - 11α,14β - dihydroxycarda - 4,20(22)-dienolide.

13. A compound of the structural formula

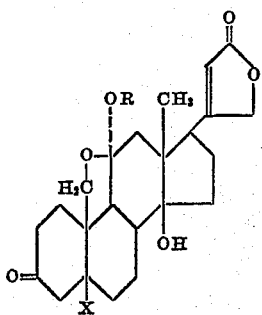

wherein R is a member of the class consisting of hydrogen and lower alkyl groups and X is a member of the class consisting of hydrogen and hydroxyl radicals.

14. 3-oxo-5β,11α,14β - trihydroxy-11,19 - epoxycard-20(22)-enolide.

15. 3-oxo - 11α,14β - dihydroxy - 11,19 - epoxycard-20(22)-enolide.

16. 3-oxo-11α - methoxy - 11,19 - epoxy-14β-hydroxy-card-20(22)-enolide.

17. 3β,11α - dihydroxy-11,19-epoxy-5α,14α - card-20-(22)-enolide.

18. 3,11 - dioxo - 19 - hydroxycarda - 4,14,20(22) - trienolide.

19. 3β,11β,19 - trihydroxy-5α,14α-card-20(22)-enolide.

References Cited in the file of this patent

Tamm et al.: Experientia, vol. 13, No. 5, pages 185–7, 1957.

UNITED STATES PATENT OFFICE

CERTIFICATE OF CORRECTION

Patent No. 2,946,786

July 26, 1960

John S. Baran

It is hereby certified that error appears in the printed specification of the above numbered patent requiring correction and that the said Letters Patent should read as corrected below.

Column 1, line 52, for "present" read -- presence --; column 6, line 74, for "hydrocarda" read -- hydroxycarda --.

Signed and sealed this 4th day of April 1961.

(SEAL)
Attest: ERNEST W. SWIDER

Attesting Officer

ARTHUR W. CROCKER
Acting Commissioner of Patents